United States Patent
Hodgins et al.

(10) Patent No.: US 8,284,202 B2
(45) Date of Patent: Oct. 9, 2012

(54) METHODS AND APPARATUS FOR CAPTURING AND RENDERING DYNAMIC SURFACE DEFORMATIONS IN HUMAN MOTION

(75) Inventors: Jessica K. Hodgins, Pittsburgh, PA (US); Sang Il Park, Tokyo (JP)

(73) Assignee: Two Pic MC LLC, Burbank, CA (US)

( * ) Notice: Subject to any disclaimer, the term of this patent is extended or adjusted under 35 U.S.C. 154(b) by 0 days.

(21) Appl. No.: 11/772,731

(22) Filed: Jul. 2, 2007

(65) Prior Publication Data
US 2008/0071507 A1 Mar. 20, 2008

Related U.S. Application Data

(60) Provisional application No. 60/817,737, filed on Jun. 30, 2006.

(51) Int. Cl.
*G06T 13/00* (2006.01)
(52) U.S. Cl. .......... 345/473; 345/474; 345/475
(58) Field of Classification Search .......... 345/473–475
See application file for complete search history.

(56) References Cited

U.S. PATENT DOCUMENTS

| | | | |
|---|---|---|---|
| 6,072,496 A * | 6/2000 | Guenter et al. | 345/419 |
| 6,320,378 B1 * | 11/2001 | Maier et al. | 324/307 |
| 6,552,729 B1 * | 4/2003 | Di Bernardo et al. | 345/473 |
| 6,674,877 B1 * | 1/2004 | Jojic et al. | 382/103 |
| 6,724,930 B1 * | 4/2004 | Kosaka et al. | 382/154 |
| 7,061,483 B2 * | 6/2006 | Desbrun et al. | 345/419 |
| 7,184,814 B2 * | 2/2007 | Lang et al. | 600/416 |
| 7,239,908 B1 * | 7/2007 | Alexander et al. | 600/427 |
| 7,242,460 B2 * | 7/2007 | Hsu et al. | 356/4.01 |
| 7,272,264 B2 * | 9/2007 | ElShishiny et al. | 382/254 |
| 2001/0045830 A1 * | 11/2001 | Maier et al. | 324/307 |
| 2003/0011589 A1 * | 1/2003 | Desbrun et al. | 345/418 |
| 2003/0215130 A1 * | 11/2003 | Nakamura et al. | 382/154 |
| 2004/0179008 A1 * | 9/2004 | Gordon et al. | 345/419 |
| 2004/0179013 A1 * | 9/2004 | Menache | 345/473 |

(Continued)

FOREIGN PATENT DOCUMENTS

JP 2001133222 A * 5/2001

(Continued)

OTHER PUBLICATIONS

Hornung et al., ("Self-Calibrating Optical Motion Tracking for Articulated Bodies" Virtual Reality, 2005 Proceedings, VR 2005 IEEE pp. 75-82 ISBN: 0-7803-8929-9 Mar. 12-16, 2005.).*

(Continued)

*Primary Examiner* — Daniel Washburn
(74) *Attorney, Agent, or Firm* — Kilpatrick Townsend & Stockton LLP

(57) ABSTRACT

A method for a computer system includes receiving global positional data associated with a set of markers from a plurality of markers associated with a surface of an object at one or more time instances, wherein global positional data associated with a first marker from the plurality of markers is absent from a first time instance, using local statistical methods to determine global positional data associated with the first marker at the first time instance in response to the global positional data associated with the set of markers at the one or more time instances, and determining a model of the object in response to the global positional data associated with the set of markers and the global positional data associated with the first marker.

12 Claims, 12 Drawing Sheets

U.S. PATENT DOCUMENTS

| | | | |
|---|---|---|---|
| 2006/0126928 A1 | 6/2006 | Edwards et al. | |
| 2007/0146371 A1* | 6/2007 | Dariush | 345/474 |
| 2008/0180448 A1* | 7/2008 | Anguelov et al. | 345/475 |

FOREIGN PATENT DOCUMENTS

| | | | |
|---|---|---|---|
| JP | 2002259984 A | * | 9/2002 |

OTHER PUBLICATIONS

Ringer et al., ("A Procedure for Automatically Estimating Model Parameters in Optical Motion Capture" BMVC 2002).*

Scott et al., ("An algorithm for associating the features of two images" Proc. R. Soc. Lond B (1991) 244 21-26).*

Anguelov et al., SCAPE: Shape Completion and Animation of People, 2005, ACM, pp. 408-416.*

Alexander et al., Correcting for deformation in skin-based marker systems, Mar. 6, 2000, pp. 355-361.*

Grung, Bjorn and Rolf Manne; "Missing Values in principal component analysis"; *Chemometrics and Intelligent Laboratory Systems*; 1998, pp. 125-139; vol. 42, Elsevier Science B.V.

Heap, Tony and David Hogg; "Towards 3D Hand Tracking using a Deformable Model"; *Proceedings of the $2^{nd}$ International Conference on Automatic Face and Gesture Recognition (FG '96)*; Oct. 14-16, 1996); pp. 140-145; IEEE.

Herda, L. et al.; "Skeleton-Based Motion Capture for Robust Reconstruction of Human Motion"; *Computer Animation 2000. Proceedings*; 2000; pp. 77-83; IEEE.

Lin, I-Chen et al.; "Extracting 3D Facial Animation Parameters from Multiview Video Clips"; *IEEE Computer Graphics and Applications*; Nov./Dec. 2002; pp. 72-80; vol. 22, No. 6; IEEE.

\* cited by examiner

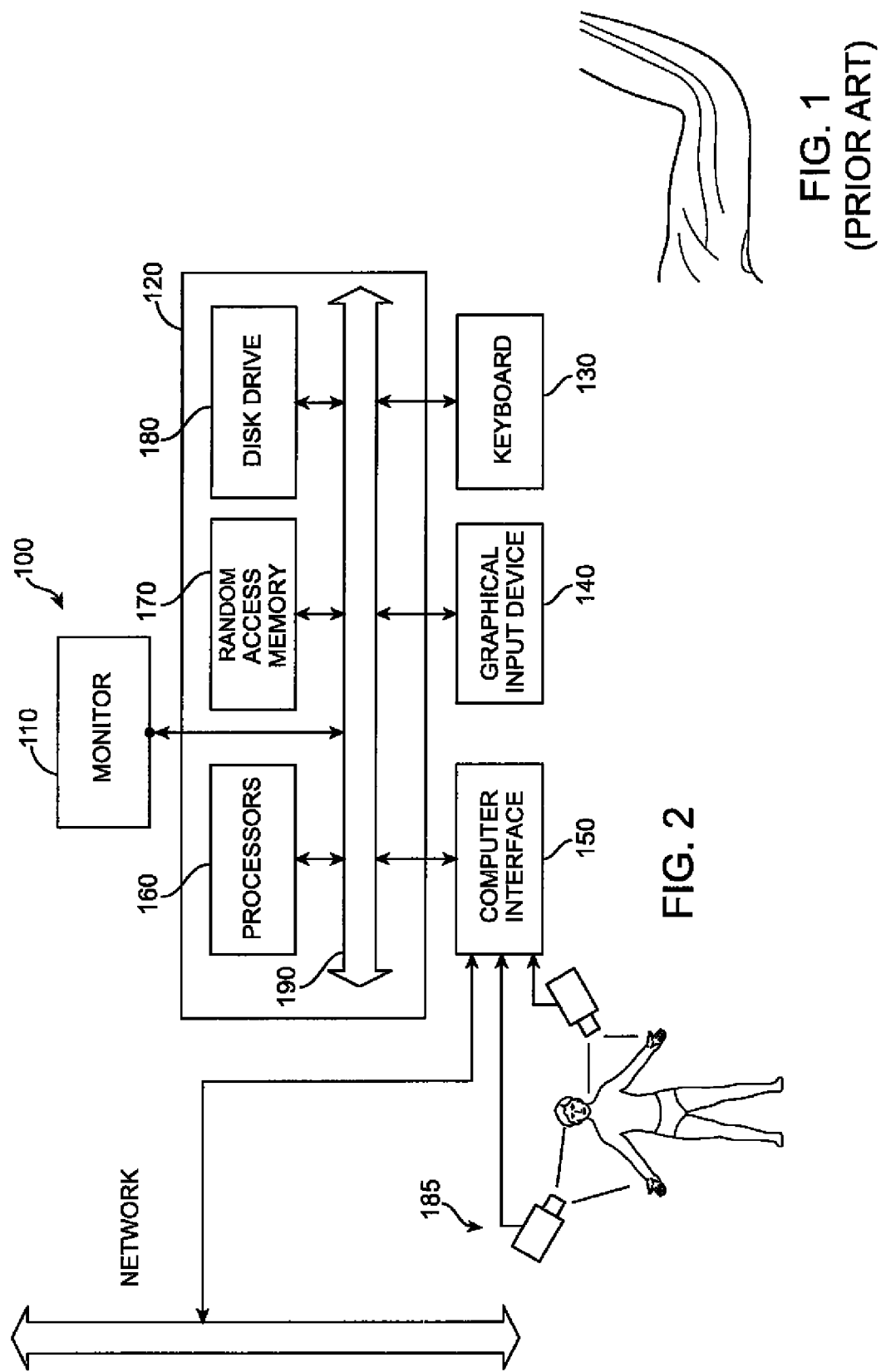

METHODS AND APPARATUS FOR CAPTURING AND RENDERING DYNAMIC SURFACE DEFORMATIONS IN HUMAN MOTION

CROSS-REFERENCES TO RELATED APPLICATIONS

The present application claims benefit of priority under 35 U.S.C. 119(e) to U.S. provisional Application No. 60/817,737, filed on Jun. 30, 2006, and hereby incorporates it by reference for all purposes.

GOVERNMENT RIGHTS

The intention was made with government support under National Science Foundation grant Nos. ILS-0326322 and CNS-0196217. The government has certain rights in this invention.

BACKGROUND OF THE INVENTION

The present invention relates to methods and apparatus for determining deformation of surfaces. More specifically, the present invention relates to methods and apparatus for determining surface deformations based upon incomplete data. Other aspects of the present invention relate to methods and apparatus for animating surfaces based upon surface deformation data.

Some embodiments of the present invention relate to capturing surface deformations of three-dimensional objects (e.g. humans, animals, objects or the like). The surface of a human body moves in many subtle but visually significant ways when performing dynamic activities such as: bending, bulging, jiggling, stretching, and the like. Various embodiments of the present invention are described below with respect to examples of human bodies, however, such examples should not be considered limiting.

Optical motion capture (mocap) techniques have been used to specify motion for cartoon characters, computer-generated characters, and the like for television programs, short and feature-length movies and video games, and the like. Some in the industry refer to the use of mocap techniques as the basis for computer generated imagery as "digital puppeteering."

The current state of the art for whole body motion capture typically rely upon tracking positions of a set of 40-60 markers placed on a (human) subject. Using such techniques, the motion of the human is reduced to motion of 15-22 rigid body segments. To the extent possible, the markers are placed on joint axes and bony landmarks so that they can be more easily used to approximate the motion of the human skeleton. The range of motion of the human is further reduced by biomechanical invariants, e.g. elbows not bending backwards.

Drawbacks to traditional mocap techniques include that the captured motion of the object often lacks detailed motions that gives the object "life." In other words, traditional mocap techniques typically record very simplified and gross motions of objects, such as only the motion of a skeleton. Traditional mocap techniques often lack subtle dynamic motion effects of the skin and muscles. Therefore, traditional mocap techniques often fail to capture the correct shapes of bulging muscles, dynamic jiggling of flesh, moving of skin, and the like.

In the current state of the art, based upon the motion captured data, the motion of computer generated humans, for example, are determined. As an example, based upon the motion captured position of the human skeleton at a certain time instance, e.g. a specific frame, a computer model of the human may be posed in the same position.

Subsequently, a variety of techniques are being used to put flesh and skin on top of the skeleton. In the industry this step is often termed "skinning." In the following discussion, facial movement and hand movement are considered separately, since simplified techniques are often used for those body parts.

One of the common skinning techniques required the CGI modeler to specify a contribution of each bone to the position of the vertices of a skin surface by painting weights on the model. In some cases, the closer a particular skin patch is to a specific joint, the greater the contribution the joint movement is to the position of the skin patch. These techniques, which have been variously called skeleton subspace deformation, single weight enveloping, or skinning, are considered easy to implement and quick to compute.

Drawbacks to such skinning techniques include that with basic implementations, no set of weights will prevent collapsing joints or a "candy wrapper" effect, as illustrated in FIG. 1. This candy wrapper effect occurs because the volume of the body is not considered and preserved when the human bends an arm, for example.

A number of recent techniques have attempted to fix the candy wrapper problems automatically, without significant computational cost. Such techniques have included interpolating spherical rotations rather than performing linear interpolations, approximating the model by swept ellipsoids, adding deformable chunks under the surface of the skin to provide a very simple model of muscle and fat, constructing a simple anatomical model from the outside in, or the like.

Drawbacks to such techniques include that although the candy wrapper effect may be reduced, such techniques do not address the issue of dynamic effects of the skin, such as the above mentioned jiggling of the flesh, muscles bulging due to exertion, and the like.

Other techniques for determining the shape of skin have included having the shape of skin being a function of the pose of the character. Such techniques have included the use of hints based upon key poses of a subject. Some examples have included these techniques along with skeleton subspace deformation, some have included these techniques with radial basis functions to interpolate among a set of example poses of a person, some have included skinning with additional degrees of freedom (and therefore more weights), and/or have included these techniques with additional joints rather than as skinning weights.

Drawbacks to such techniques include that these techniques rely upon specifically posed positions of the character model. Additional drawbacks include that the poses of these models are created by hand by an object modeler. These techniques attempt to model changes in the shape of the body as a function of pose from a modeling stand point, and not upon motion captured data. As a result, such techniques do not model dynamic effects such as changes in shape as a function of the torque being applied at a joint. Further, these techniques thus do not address the issue of dynamic effects of the skin, such as the above mentioned jiggling of the flesh, muscles bulging due to exertion, and the like.

Other data-driven approaches have relied on scanning (e.g. laser scanning) of subjects (e.g. humans) obtained while the character holds specific poses. An example technique correlates a single set of scanned data for an upper body of a character to specific motion captured poses for the character. Superficially, such a technique may appear to have divided movement of a surface into a rigid body (e.g. motion captured pose) and a residual deformation (e.g. a single set of scanned data). However, the movement of the rigid body and the residual deformation, are not based upon motion captured data at a particular time (e.g. a particular frame). As noted above, these data sets are captured at different frames.

Drawbacks to such approaches also include that they do not use dynamic effects in the surface of the skin of the character and the rigid motion of the character at the same period of time (e.g. frame time). Accordingly, for identical poses of the character, the shape of the skin will be the same. In other words, the skin of the character (e.g. pectoral muscles) will have the same shape if the human subject is pointing their toes and an inch off the ground. More specifically, there is no distinction if the human subject is in the process of jumping up or about to land on the ground.

Another technique has been to capture deformations of silhouettes of an object along with motion of a skeleton. Such a system, however is limiting as it merely captures motion along a profile of the object, and not motions of other portions of the object.

Additional approaches have included attempting to realistically model and simulate the underlying musculature of the human body. Such approaches attempt to model complex anatomy of an object, e.g. a human, and also attempt to simulate functionality of the anatomy. For instance, some systems attempt to model the flex of muscles as they apply joint torques. Other systems attempt to model the quasi-static movement of flesh with a finite number of elements, and to perform a finite element analysis. Still other systems use simple dynamic models of the anatomy to add dynamic effects to the motion of skin.

Drawbacks with such approaches include the difficulty in modeling the anatomy, the computational burden of determining the motion of underlying anatomy, the difficulty in controlling and predicting the results of the computations, and the like. Another drawback includes that the result of the simulation system determines the muscle shape, but not how the skin is deformed in response to the muscle shape.

The hands and face are considered special cases for the problem of animating skin motion. Specifically, because positions of faces of characters are relatively planar, conventional motion capture techniques can used more reliably than for other portions of a human. Because facial deformations do not include significant occlusions, they can be captured using capture techniques such as structured light. Additionally, for faces, rigid body motion considerations are typically not considered. In the case of hands, because hands are relatively bony in structure, hand deformations are not well captured using markers.

In light of the above, what is desired are methods and apparatus for capturing and animating dynamic surface deformations of objects without the drawbacks described above.

BRIEF SUMMARY OF THE INVENTION

The present invention relates to methods and apparatus for determining deformation of surfaces. More specifically, the present invention relates to methods and apparatus for determining surface deformations based upon incomplete data. Other aspects of the present invention relate to methods and apparatus for animating surfaces based upon surface deformation data.

In various embodiments of the present invention, motion capture of a subject (e.g. a human) begins with the placement of a very large set of markers (e.g. 350). These markers are placed on bony landmarks of the human and on the muscular and other fleshy portions of the body. By using a large set of markers, various embodiments attempt to simultaneously capture the rigid body motion of the skeleton and the deformations of the fleshy portions of the body, e.g. skin. In some embodiments, the number of markers is large compared to traditional motion capture systems. However, because of the large number of soft portions of a human, the number of markers may still be considered a sparse representation of the true shape of the body.

Two specific challenges encountered with these implementation include: processing missing/noisy markers and include deforming the reference model to match the marker motion. Further, because of the large number of small markers and occlusions by other body parts, the three-dimensional (3D) positions of the markers from the motion capture device frequently exhibit missing and disconnected segments. In various embodiments, a local model defined on each marker by its neighbors to merge disconnected segments during the capture phase. Further, to match the marker positions to the reference model, the marker motion into a set of rigid motions and the residual deformation is estimated for each marker with missing positional data.

In various embodiments, during motion of the object, e.g. human, the rigid body motion of the dense marker set is extracted from the three-dimensional trajectories, and the local deformations of the polygonal model are also extracted from the remaining motion of the markers in three-dimensions in a global reference frame. During various motions, one or more markers may be occluded. In such embodiments, the position of occluded markers are estimated for a particular frame time in a local frame and then mapped in the global frame. The estimated position of the markers are determined from the locations (e.g. positions) of neighboring markers using a local model of the surface shape at other frame times during the user motion. The positions of virtually all markers of the object, during a specific motion, may thus be determined.

In various embodiments of the present invention, the motion of rendered skin can be computed by segmenting the markers into the motion of a set of rigid parts and a residual deformation taken at the same time period (e.g. frame). In various embodiments, a quadratic transformation and a radial basis function are used to smoothly blend the positions of the markers. As will be illustrated in the figures, flexing of muscles, high frequency motions, and abrupt decelerations of motion captured humans can now be more accurately be rendered by a computer.

Various examples of the above embodiments have been experimentally tested. Examples of the experimental data are illustrated in the figures.

According to one aspect of the invention, a method for a computer system is described. One technique includes receiving global positional data associated with a set of markers from a plurality of markers associated with a surface of an object at a first time instance, wherein global positional data associated with a first marker from the plurality of markers is absent at the first time instance. A process also include using local statistical methods to determine global positional data associated with the first marker at the first time instance in response to the global positional data associated with the set of markers at the first time instance, and determining a model of the object in response to the global positional data associated with the set of markers and the global positional data associated with the first marker.

According to another aspect of the invention, a method for a computer system is described. One technique includes receiving global positional data associated with a set of markers from a plurality of markers associated with a surface of an object at a plurality of time instances excluding a first time instance, wherein global positional data associated with a first marker from the plurality of markers is absent at the first time instance. A method includes using local statistical methods to determine global positional data associated with the first marker at the first time instance in response to the global positional data associated with the set of markers for the plurality of time instances, and determining a model of the object in response to the global positional data associated with the set of markers and the global positional data associated with the first marker.

According to another aspect of the invention, a computer program product comprises code resident on a tangible media and executable on a computer system comprising a processor is described. The computer program product may include code that instructs the processor to receive global positional data associated with a set of markers from a plurality of markers associated with a surface of an object at one or more time instances, wherein global positional data associated with a first marker from the plurality of markers is absent from a first time instance, and code that instructs the processor to use local statistical methods to determine global positional data associated with the first marker at the first time instance in response to the global positional data associated with the set of markers at the one or more time instances. The computer program product may include code that instructs the processor to determine a model of the object in response to the global positional data associated with the set of markers and the global positional data associated with the first marker. The tangible media may include optical media, magnetic media, semiconductor media, or the like.

According to another aspect of the invention a computer system is described. One apparatus includes a memory configured to store global positional data associated with a set of markers from a plurality of markers associated with a surface of an object at one or more time instances, wherein global positional data associated with a first marker from the plurality of markers is absent from a first time instance. A device may include a processor coupled to the memory, wherein the processor is configured to use local statistical methods to determine global positional data associated with the first marker at the first time instance in response to the global positional data associated with the set of markers at the one or more time instances, and wherein the processor is configured to determine a model of the object in response to the global positional data associated with the set of markers and the global positional data associated with the first marker.

According to another aspect of the invention, a method for a computer system is described. One technique includes receiving a plurality of marker trajectory fragments to be associated with a plurality of markers that are distributed on a surface of a subject, and determining an association of marker trajectory fragments with a marker using local statistical relationships of the marker.

According to one aspect of the invention, a method for a computer system is described. One process includes determining a plurality of marker positions associated with a plurality of markers associated with a surface of a subject, and adjusting marker positions for a set of markers from the plurality of marker positions to determine adjusted marker positions for the set of markers. A technique includes using the adjusted marker positions in a rendering process to form an image, storing a representation of the image on a tangible media, and displaying the image to a user on a display.

According to another aspect of the invention, a computer system is described. One device includes a memory configured to store a plurality of marker positions associated with a plurality of markers associated with a surface of a subject. An apparatus includes a processor coupled to the memory, wherein the processor is configured to adjust marker positions for a set of markers from the plurality of marker positions to determine adjusted marker positions for the set of markers, wherein the processor is configured to use the adjusted marker positions in a rendering process to form an image, and wherein the processor is configured to output the image to a user on a display. In various configurations, the memory is also configured to store a representation of the image on a tangible media.

According to another aspect of the invention, a computer program product comprises code resident on a tangible media and executable on a computer system comprising a processor is described. The computer program product may include code that directs the processor to determine a plurality of marker positions associated with a plurality of markers associated with a surface of a subject, and code that directs the processor to adjust marker positions for a set of markers from the plurality of marker positions to determine adjusted marker positions for the set of markers. The program may include code that directs the processor to use the adjusted marker positions in a rendering process to form an image, code that directs the processor to store a representation of the image on a tangible media, and code that directs the processor to output the image to a user on the display.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 1 illustrates an example of the prior art;

FIG. 2 illustrates a block diagram of typical computer system according to various embodiments of the present invention;

DETAILED DESCRIPTION OF THE INVENTION

Figure 3A:
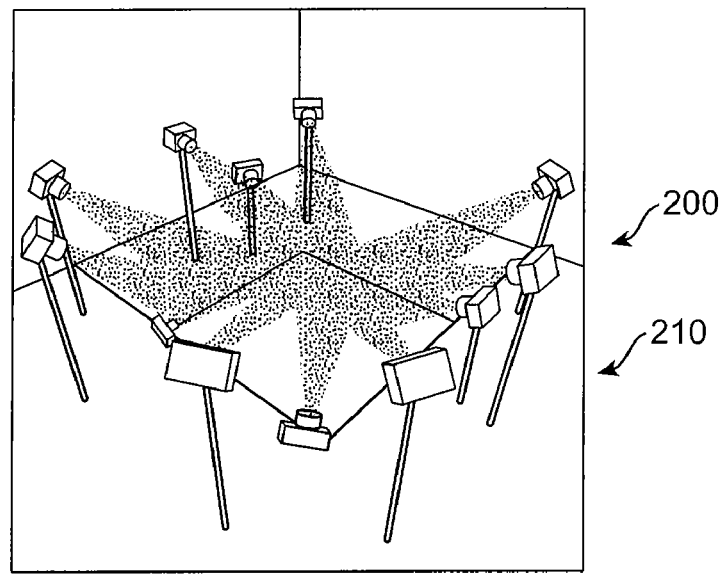
FIGS. 3A-B illustrate additional embodiments of the present invention.

FIG. 2 illustrates a block diagram of typical computer system 100 according to various embodiments of the present invention.

In the present embodiment, computer system 100 typically includes a monitor 110, computer 120, a keyboard 130, a user input device (e.g. a graphical input device) 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components. Various embodiments include one or more motion capture devices 185, such as video cameras, that capture motion of an object, such as a human being.

In one embodiment, computer 120 includes one or more Core™ microprocessors from Intel. Further, in the present embodiment, computer 120 typically includes a UNIX-based operating system.

RAM 170 and disk drive 180 are examples of tangible media configured to store embodiments of the present invention including data such as image files, models including geometrical descriptions of objects, shaders and shading parameters, ordered geometric descriptions of objects, procedural descriptions of models, scene descriptor files and scene parameters, a rendering engine, texture files, third-party motion capture software (e.g. software from Vicon Motion Systems), motion capture positional data, executable computer code, human readable code, or the like. Other types of tangible media include floppy disks, removable hard disks, optical storage media such as CD-ROMS and DVDs, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Itanium™ microprocessors; Turion™ 64, Opteron™ microprocessors from Advanced Micro Devices, Inc; and the like. Further, other types of operating systems are contemplated, such as Windows-Vista®, WindowsNT®, or the like from Microsoft Corporation, Solaris from Sun Microsystems, LINUX, UNIX, and the like. In still other embodiments, some of the processing hardware may be implemented upon a chip or an auxiliary processing board (e.g. graphics processor unit, a camera controller, or the like).

Figure 3B:
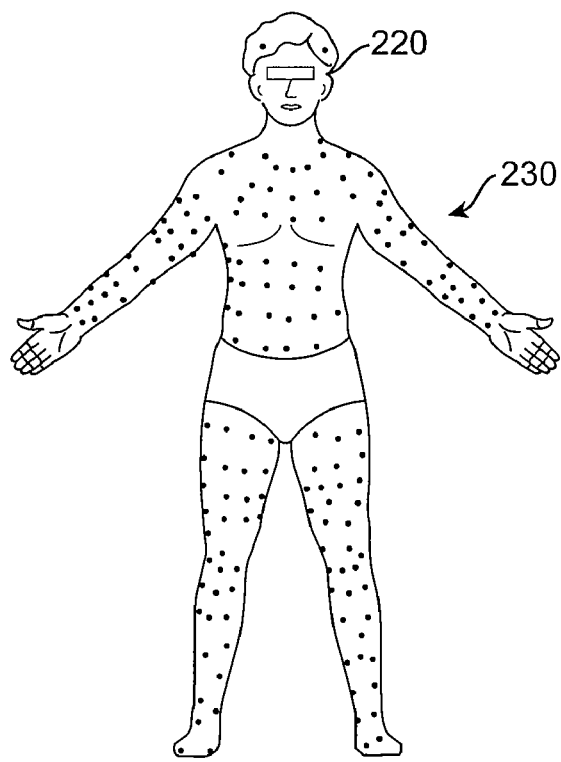

FIGS. 3A-B illustrate additional embodiments of the present invention. More specifically, FIG. 3A illustrates an exemplary camera configuration, and FIG. 3B illustrates an exemplary marker configuration on a human actor.

In the example in FIG. 3A, multiple cameras are used to capture a motion of an object within a central region between the cameras. In various embodiments of the present invention, a number of cameras 200 are positioned around an area 210 where an object will be positioned. In various implementations, cameras 200 include twelve near infra-red cameras having a four mega-pixel resolution and a frame rate of 120 frames per second. In other implementations, greater or fewer number of cameras may be used depending upon accuracy desired. In the embodiments illustrated in FIG. 3A, more than one camera 200 is positioned upwards to facilitate capturing of markers which face towards the floor.

In various embodiments, cameras may have different sensitivities to light (e.g. infra-red, near-infrared, visible, ultra-violet), cameras may have different capture resolutions (e.g. two mega pixels, six megapixels), cameras may have different frame rates (e.g. 30 fps, 60 fps), or the like. In some embodiments, commercially available optical motion capture systems (i.e. cameras, processing software, etc.) such as from Vicon Motion Systems may be used for capturing and computing positional data.

In the example of FIG. 3B, a subject (a human) 220 for which dynamic motion is to be captured is illustrated. Placed on the skin of subject 220 are a number of markers 230. In one implementation, markers 230 are approximately 3.0 mm in diameter and are hemispherical shape to reduce the offset of the markers from the body. In other embodiments, a greater of fewer number of markers 230 may be used; the markers may have different shapes or diameters; the markers may be reflective or self-illuminating; and the like.

As illustrated in the example in FIG. 3B, a large number of reflective markers 230, approximately 350 in number, are placed over the entire body of subject 220. This large number is in contrast to older motion capture systems that use a small number of markers (e.g. approximately 50) for full-body motion capture. In various embodiments of the present invention, markers 230 may be, but need not necessarily be, evenly distributed across the body. In one implementation, an approximate rectilinear grid was drawn upon subject 220, and markers 230 were placed approximately upon the grid intersections. In other embodiments, grids may have other shapes, such as triangular, hexagonal, or the like. In one implementation, markers 230 were placed approximately four to five centimeters apart, although other spacings may also be used. In various embodiments, additional markers 230 could be placed on specific portions of subject 220 where higher frequency skin motion are contemplated. In some implementations, this may include the tip of the elbow, the lower part of the shoulder blade, the lower portion of the pectoral muscles, the "beer belly" portion, and the like.

In other embodiments of the present invention, subject 220 may be an animal or plant, an inanimate object, or the like. As examples, the subject may be a dog running on a treadmill, a tree twisting and swaying in heavy winds, a deformable object, e.g. a rubber ball; a breakable object, e.g. a ceramic mug; a vehicle, e.g. an automobile; or any other object that the user wishes to motion capture.

As mentioned above, in some embodiments of the present invention, any commercial software and hardware system could be used to capture and determine the location of at least some of reflective markers 230 in space, as a function of time. In one specific embodiment, a software product named IQ 2.0 software from Vicon Motion Systems was used to determine the three-dimensional position of at least some of markers 230.

As discussed in the Background section, reconstruction of the three-dimensional position of a human was previously aided by the definition of a skeleton model of the human that had rigid link assumptions. In contrast, in various embodiments of the present invention, the inventors could not use the same approach to determining dynamic positions of markers 230. This was because of the significant deformations to the skin of the human when performing dynamic actions, e.g. jumping a rope, shaking hips, etc.

As will be discussed below, determining positions of markers that are occluded from cameras 200 is a challenge when capturing dynamic motions of a body. Specifically, because whole body motion capture is desired in various embodiments for large body motions, it has been demonstrated that a large number of markers are simultaneously occluded at the same time, and over the different times, e.g. frames. See Table 1, below. Further, for body motions, global reference frames and local reference frames are considered in various embodiments. By way of contrast, for motion capturing of faces, the number of occlusions for markers is typically very small, and local reference frames are not used. Thus facial animation techniques do not need to solve the same problems.

In light of the significant occlusion problem discovered by the inventors, and not heretofore faced by others in the industry, the inventors developed a number of novel techniques to estimate the actual positions of such occluded markers. As will be discussed below, cleaning and recovering of missing marker positional data uses a local reference frame specific for each missing marker and uses spatial relationships for each missing marker and its respective neighboring markers. The position in the global reference frame is then determined for the missing marker.

Figure 4A:
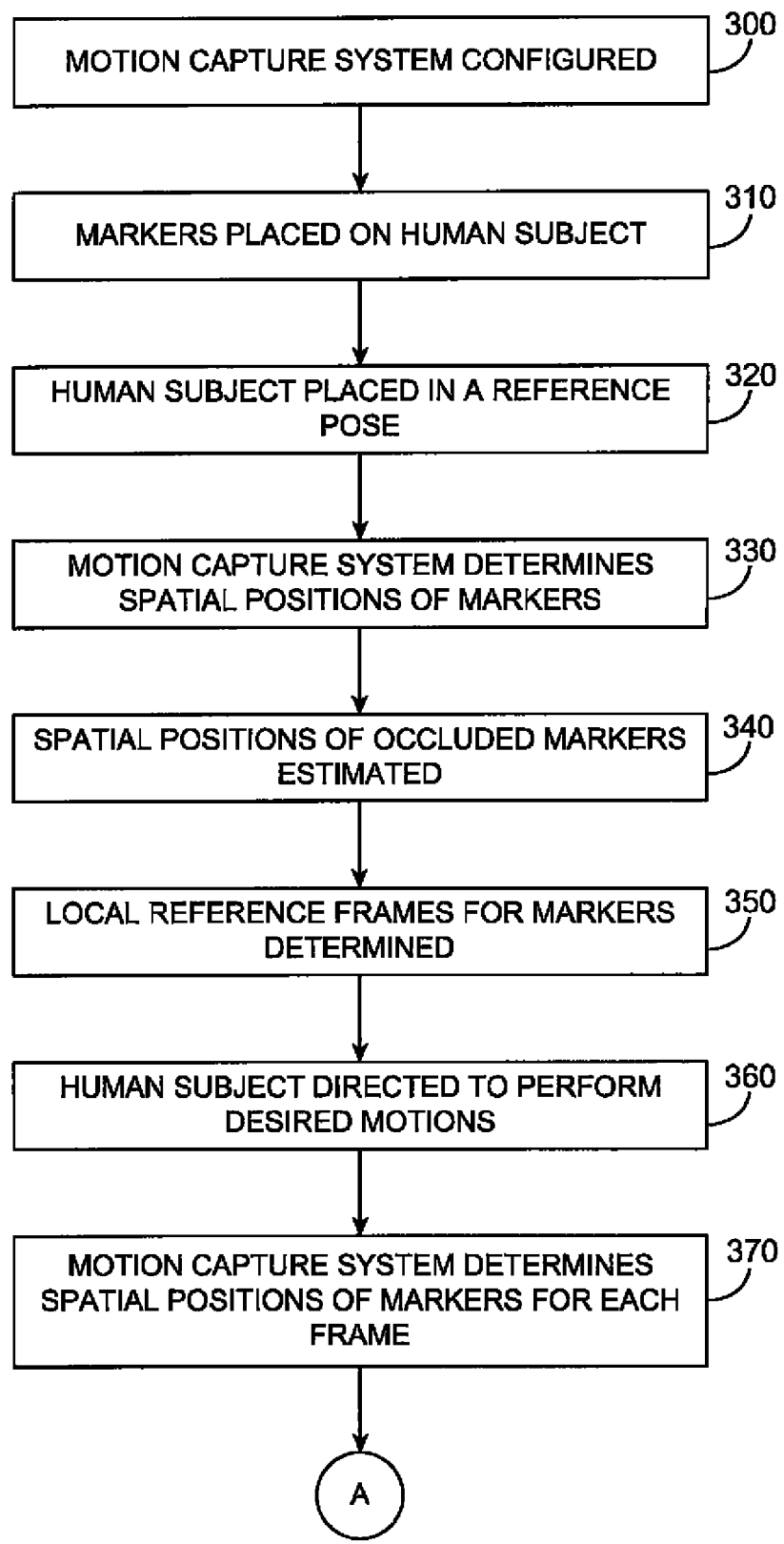
FIGS. 4A-B illustrate a block diagram of a process according to various embodiments of the present invention.
Figure 4B:
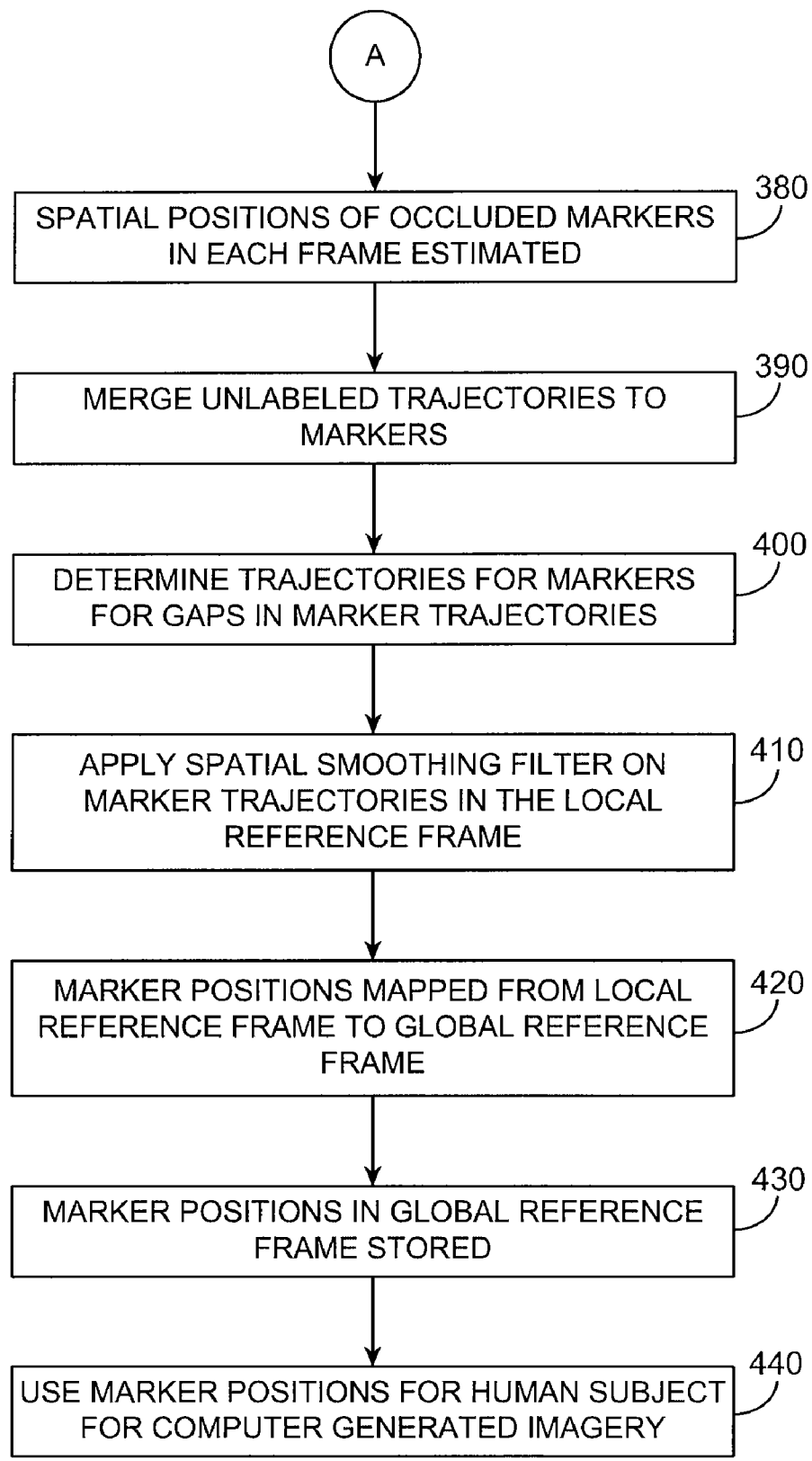

FIGS. 4A-B illustrate a block diagram of a process according to various embodiments of the present invention.

Initially, a motion capture system is provided, including a number of cameras, as discussed above, step 300. Next, markers are placed on the subject, as also discussed in various embodiments above, step 310.

In various embodiments, the subject is placed within a "reference pose," step 320, and using the motion capture system, the position of at least some of the markers on the subject are captured, step 330.

In various embodiments, data captured while the subject is in the reference pose is used to help estimate the local shape of the subject. In some embodiments, the reference pose is selected for the subject to attempt to capture positions for most, if not all markers located on the subject.

In various embodiments, positional data for any missing markers, e.g. an armpit of a subject, may be manually provided based upon known positions of such markers on the subject, based upon the position of markers in other supplemental poses (e.g. with the subject's arms raised), or the like. After determining positions of occluded markers, positions for all markers for the object in the reference pose are determined, step 340. An example of a reference pose for a subject was illustrated in FIG. 3B.

In response to the marker positions, a number of data values are computed, typically for each marker position, step 350. In various embodiments, a mesh of local reference frames is determined for each marker position. Examples of a mesh of local reference frames is illustrated in FIG. 5E.

Figure 5A:
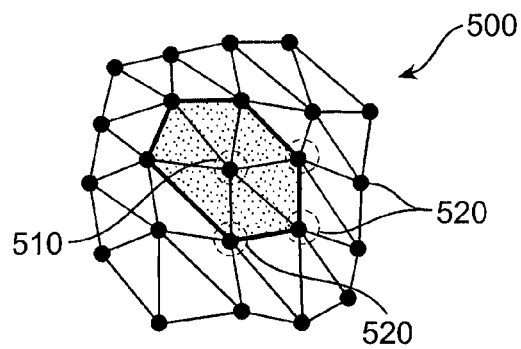
FIGS. 5A-E illustrate examples of data values associated with marker positions of the subject in the reference pose.
Figure 5B:
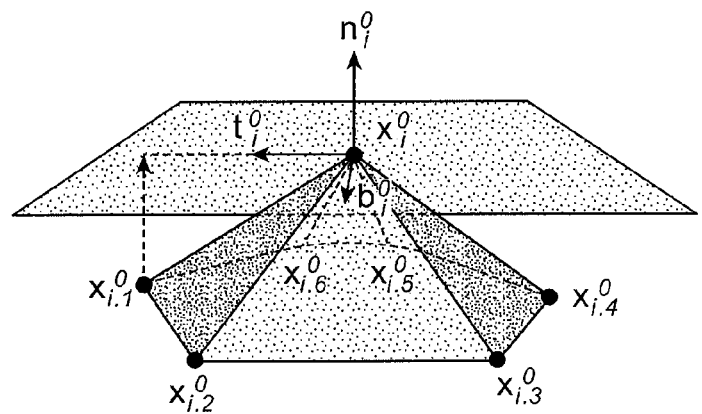
Figure 5C:
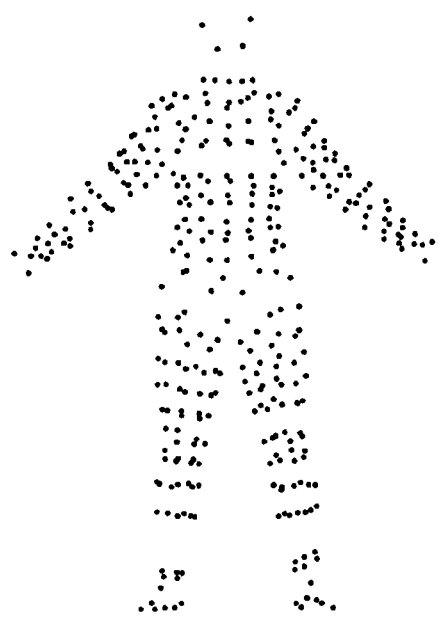
Figure 5D:
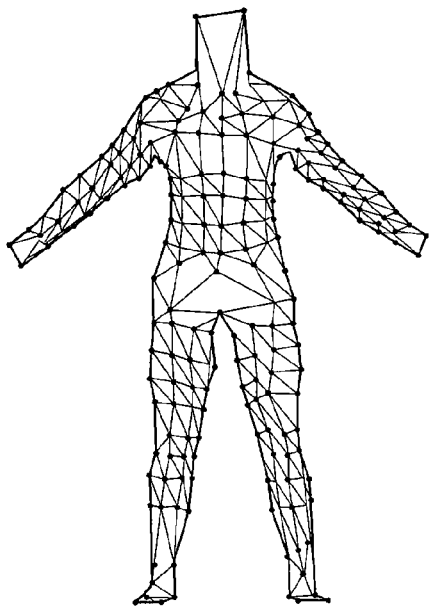
Figure 5E:
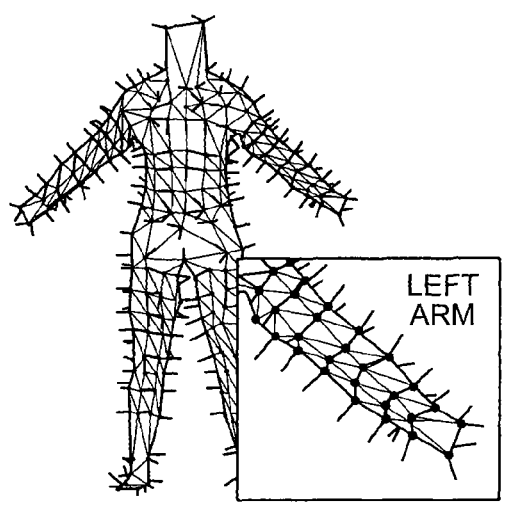

FIGS. 5A-E illustrate examples of data values associated with marker positions of the subject in the reference pose. More specifically, FIG. 5A illustrates a portion of a marker surface 500 or mesh formed from the marker positions. In FIG. 5A, for each marker position, e.g. marker 510, a set of neighborhood markers, e.g. markers 520, are identified. In various embodiments, neighborhood markers are determined based upon the geodesic distance along the surface of the object from marker to adjacent marker. In various embodiments, this process may be performed manually, or automatically.

As illustrated in FIG. 5B, a number of data values are determined for each marker along the marker surface. Referring to FIG. 5B, a marker is indexed with index i as $m_i$, where $1 \leq i \leq N$, where N is the number of markers. Further, markers within the immediate neighborhood, i.e. one-ring neighbors, are denoted $m_{i,k}$, where $1 \leq k \leq d_i$, where $d_i$ is the number of markers within the neighborhood, i.e. a valence of marker i.

Further, with respect to FIG. 5B, a position of the i-th marker is denoted $x_i^0$, and the position of its one-ring neighbors are denoted $x_{i,k}^0$ within the marker positions determined in the reference pose discussed above in step 340. Using this nomenclature, a local frame for marker i in the reference pose with an origin at $x_i^0$, a triplet of data values is determined: ($t_i^0$, $n_i^0$, $n_i^0$). As can be seen, $n_i^0$, in this data set represents a surface normal vector of the i-th marker given the reference pose. Further, $t_i^0$, in this data set represents a unit vector with a direction of a projection of a vector ($x_{i,1}^0 - x_i^0$) onto a tangential plane defined by $n_i^0$, with respect to $x_{i,1}^0$. In other embodiments, it will be apparent that $t_i^0$ will depend upon which of the one-ring neighbors are selected. $b_i^0$ in this data set represents a unit vector that is orthogonal to $n_i^0$ and $t_i^0$.

In various embodiments of the present invention, the local frame for is defined by the ($t_i^0$, $b_i^0$, $n_i^0$) vectors. The local frame is also referred to herein as a "local reference frame." More formally, the position of the k-th one-ring neighbor, measured within the local reference frame of marker i is represented by the following equation:

$$\hat{x}_{i,k}^0 = R_i^0 (x_{i,k}^0 - x_i^0)$$

In this representation, $R_i^0 \in \mathbb{R}^{3\times3}$ is a rotation matrix defined as $[t_i^0, n_i^0, n_i^0]^T$.

Returning to FIGS. 4A-B, in various embodiments, the subject is directed to perform specific motions, step 360, and the motion capture system captures marker data for visible markers, step 370. The marker data is referred-to herein as marker trajectories and/or positional data. That is, for a specific moment in time, a specific frame, a distance offset and a direction offset are determined for markers starting at the beginning of the frame until the end of the frame.

In practice, it has been discovered by the inventors that trajectories (and/or positional data) of markers are often broken into many partial trajectories or partial marker data sets. In other words, trajectories of a specific marker may not be associated with that specific marker. Some of the reasons for missing trajectories include markers becoming occluded by the subject in motion, the motion capture system getting markers confused with each other, or the like. Examples of this will be illustrated in FIGS. 6A-E, below.

In various embodiments, before partial trajectories can be matched to the appropriate markers, the positions of most of the relevant markers must be determined for the relevant frames. As mentioned in step 370, positional data for markers that are visible to the cameras are determined. In various embodiments, certain markers may be occluded for certain frames in the subject motion, thus the position of markers that are occluded are estimated for the relevant frames in step 380. A more detailed process of this is illustrated in FIG. 7.

Figure 7:
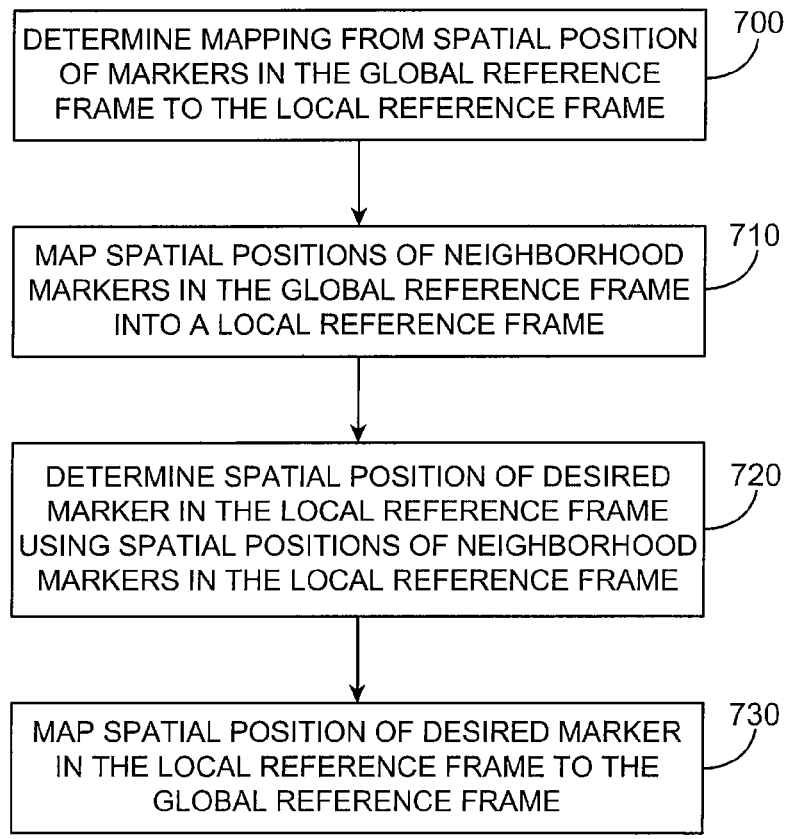
FIG. 7 illustrates a block diagram of a process according to various embodiments of the present invention.

FIG. 7 illustrate a block diagram of a process according to various embodiments of the present invention. In various embodiments, the inventors have determined that the local frame topology of markers placed on a surface of certain types of subjects tends not change from the local frame topology of the subject in the original reference pose. Accordingly, the inventors have determined that it is possible to estimate the local and global frame positions of occluded markers based upon the local and global frame positions of the respective visible neighboring markers from the reference pose.

Mathematically, at frame t, an instantaneous set of available markers are denoted $Y^t$. In various embodiments, suppose trajectory data for marker $m_i$ is missing, while some trajectory data for its neighbors are available $(m_{i,k} \in Y^t)$. In such embodiments, a translation: $d_i^t \in \mathbb{R}^{3 \times 3}$ and a rotation $R_i^t \in \mathbb{R}^{3 \times 3}$ are first determined to map positions of the neighborhood markers from a global frame to a local reference frame, step 700. Next, the available neighbor markers are moved from their current position $x_{i,k}^t$ approximately to the reference position $\hat{x}_{i,k}^0$ in the local reference frame for $m_i$, using the rotation and translation matrices, step 710. In various embodiments, the current position of the of the marker $m_i$ is then estimated in the local frame, in response to the positions of the neighbor markers in the local reference frame, step 720. Subsequently, the position of the marker is determined by translating and rotating the reference position for $m_i$ in the local reference frame back to the global frame, step 730.

In various embodiments, due to the surface of the object stretching or folding, for example, neighbors of a marker do not necessarily have a fixed or rigid position with respect to the marker. Accordingly, in various embodiments, a least squares optimization is performed to determine the translation and rotation. This is represented by an absolute orientation problem in shape matching with the following mathematical relationship:

$$\underset{d_i^t, R_i^t}{\operatorname{argmin}} \sum_{k | m_{i,k} \in Y^t}^{d_i} \| R_i^t \cdot (x_{i,k}^t + d_i^t) - \hat{x}_{i,k}^0 \|^2.$$

In some embodiments, various techniques may be used to solve this problem, as discussed in the provisional application referred-to above.

Various embodiments of the present invention, use a neighborhood of six neighborhood markers, although, any number of neighboring markers be used. In various embodiments, positions of at least three neighboring markers are used to compute the rigid transformation within a frame, discussed above. In some embodiments, where positional data of more than three neighboring markers are known (e.g. 4 out of 6, 3 out of 5, etc.), the positional data associated with the marker can be estimated with greater accuracy. In various embodiments of the present invention, positional data for markers are determined for markers with larger numbers of known neighbor markers, before markers with fewer numbers of known neighborhood markers. For example, positions for markers having five known neighborhood markers are determined before markers having three known neighborhood markers, and the like. As a result of the above process, positions of markers, even occluded markers are known or estimated for the relevant frames.

Returning to a discussion of FIGS. 4A-B, with respect to marker trajectories, markers in the first frame were labeled when constructing the mesh surfaces. Thus, for markers that are not occluded and are not confused with other markers throughout the subject motion, the trajectory data for such markers should be continuous over the motion. Such trajectory data is labeled as being associated with the specific marker identifier (e.g. number, alphanumeric, etc.).

In various embodiments, as discussed above, some trajectory data that are captured are not labeled as associated with specific markers. In such cases, the inventors have determined that estimating which markers the unlabeled markers are associated with, based upon the last known position and velocity of markers, does not work reliably for highly dynamic motions, and/or long occlusions of markers.

In various embodiments, because positions of markers were determined in step 380, above, for a specific frame, unlabeled trajectories that are within specific positional tolerances of these markers are assigned to the close markers, step 390. This step may be referred-to as merging of disconnected trajectories. More specifically, for missing marker $m_i$, embodiments search for unlabeled trajectories (fragments of trajectory data) that are within a threshold distance $\epsilon_i^1$ of the marker's estimated position (step 380). Additionally, in various embodiments, the time segment of the unlabeled trajectory also should not overlap with known trajectories of marker $m_i$. In various embodiments of the present invention, the threshold is determined based upon an average distance from the marker to its neighbors in the reference pose:

$$\epsilon_i^1 = \alpha^1 \frac{\sum_{k=1}^{d_i} \|\hat{x}_{i,k}^0\|}{d_i}$$

In the above equation $\alpha^1$ represents a tolerance factor.

In various embodiments of the present invention, the matching of unlabeled trajectories to markers is a challenging problem, as markers from different parts of a subject may be close enough to the estimated position of the estimated marker, to cause trajectories to be merged incorrectly. As an example, a marker on an upper arm, near an armpit, may be confused with nearby markers on a torso of a subject. In various embodiments, to facilitate disambiguation of marker trajectories from closely adjacent surfaces, it is determined whether the unlabeled trajectory is within a threshold $\epsilon_i^2$ of a position estimated from neighboring markers in each frame. In some embodiments, the threshold $\epsilon_i^2$ is computed in a similar fashion to $\epsilon_i^1$, above, but using a tolerance factor $\alpha^2$. Based upon experimental data, values of $\alpha^1$ may be set to approximately 0.5 and $\alpha^2$ may be set to approximately 0.6, although other values may also be used.

In some embodiments, not all unlabeled trajectories are typically successfully associated with a specific marker. Some possible reasons for this include extreme local deformations. In some cases, the matching of unlabeled trajectories to markers may be supplemented with user intervention.

FIGS. 6A-E illustrate marker trajectories according to an example of an implementation of the present invention. More specifically, FIGS. 6A-D illustrate partial unlabeled marker trajectories 600-630 that are not associated with a marker. Using the process described above in this example, partial marker trajectories 600-620 are determined to be associated with a single marker. Marker trajectories 600-620 are thus merged or placed together, as illustrated in trajectory 640, FIG. 6E. In the present example, the partial trajectory 630 was determined not to be associated with the marker.

Figure 6A:
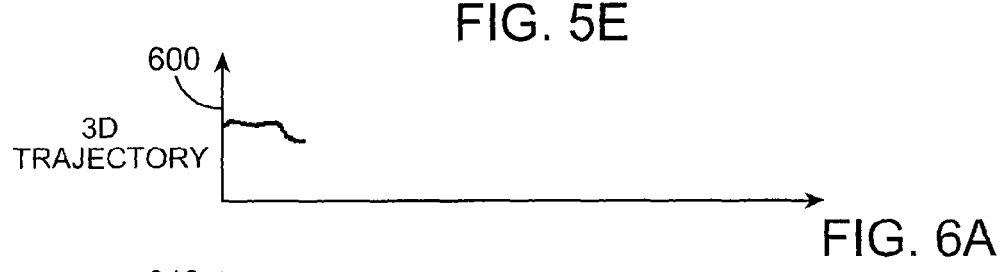
FIGS. 6A-E illustrate marker trajectories according to an example of an implementation of the present invention.
Figure 6B:
Figure 6C:
Figure 6D:
Figure 6E:

In various embodiments, as illustrated in FIG. 6E, matching trajectories may not exist for some markers in some frames due to occlusion. For example, holes or gaps 650-680 are illustrated in trajectory 640. To "fill" in these holes, or gaps, the following process may be used in various embodiments.

In various embodiments of the present invention, holes or gaps in the merged trajectories are filled using a statistical model of the spatial relationship between a marker and its neighbors, step 400. A more detailed process of this is illustrated in FIG. 8.

Figure 8:
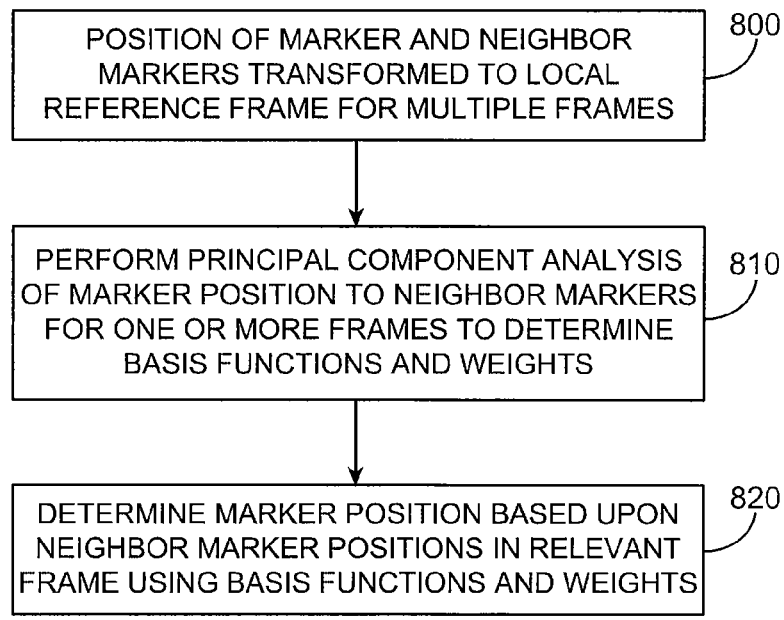
FIG. 8 illustrates a block diagram of a process according to various embodiments of the present invention.

FIG. 8 illustrates a block diagram of a process according to various embodiments of the present invention. In various embodiments, the inventors use a Principal Component Analysis (PCA) to determine positions of relevant markers with respect to their one-ring neighbors, throughout the range of motion (i.e. other frame times). In other words, the PCA is based upon the relationship of the marker to its neighboring markers in frame times where their positions are known. Marker locations may then be estimated by using a best-fit type process to fit data of the available markers. In some embodiments, contributions of one-ring neighbors may be weighted with different weights.

In various embodiments, the position of each marker and its neighbors are transformed to a local frame for multiple frame times, step 800. More specifically, for marker $m_i$ at frame time t, the position of the neighbors in the local frame is represented as:

$$\hat{x}_{i,k}^t = \overline{R}_i^t (x_{i,k}^t - x_i^t)$$

In this equation, $x_i^t$ and $\hat{x}_{i,k}^t$ are the global position of the marker i and the local position of its k-th neighbor, respectively. Further $\overline{R}_i^t$ is a rotation matrix. In various embodiments, $\overline{R}_i^t$ is a rotation matrix that transforms the marker positions to the local frame, discussed above. In other embodiments, because there is missing or damaged data, it may not be able to determine that transformation. In such embodiments, the rotation matrix $\overline{R}_i^t$ is selected such that $\hat{x}_{i,k}^t$ is sufficiently close to the local reference position:

$$\underset{\overline{R}_i^t}{\operatorname{argmin}} \sum_{k | m_{i,k} \in Y^t}^{d_i} \|\hat{x}_{i,k}^t - \hat{x}_{i,k}^0\|^2$$

Next, in various embodiments, a PCA model is build for the desired markers, using local frame positional data for frame times where the desired markers and the respective neighboring markers are present, step 810. In some embodiments, all or less than all respective neighboring markers need be present in the same frame. As discussed above, with PCA, the neighborhood of the desired markers (in the local frame) can be represented with reduced orthogonal basis, while maintaining a desired level of accuracy.

In various embodiments, the positions of the desired markers in the relevant frames are then estimated, step 820. More specifically, coefficients are determined for the basis vectors determined in the PCA. In some embodiments, the coefficients are selected to reduce or minimize a squared distance between the reconstructed positions of the available neighborhood markers and the positions of the markers determined above. In some embodiments, where a specific marker is missing in a frame, the PCA model is applied to the local frame positions of neighbor markers of the specific marker for other frame times in the motion, to then estimate the value of the specific marker. Additional value averaging may be also be applied.

Returning to the discussion in FIGS. 4A-B, after the trajectories of the markers are estimated for the different frames, smoothing filters may be applied to reduce noise and jitter, step 410. More specifically, in various embodiments, a time-domain filter is applied to the marker trajectory. Experimentally, it was determined that rigid body motions of a human subject are large, however filtering global trajectory may adversely affect rigid body motion and the local motion. Accordingly, filtering in the time domain was used.

In various embodiments, more than one smoothing filter may be applied to the local trajectory based upon the rule:

$$\hat{x}_i^t \leftarrow \hat{x}_i^t - \lambda \Delta^4 \hat{x}_i^t$$

In this relationship, $\lambda$ is a damping factor that influences the rate of convergence and $\Delta$ is a derivative operator in time.

Subsequently, the filtered position in the local frame at the specific frame time is then transformed back to the global frame for the specific frame time, step 420, and may be stored, step 430. The positional data may also be represented in three dimensions to a user on a display for motion analysis purposes, or the like, step 440.

In various embodiments, at this time, positions of desired markers are known for relevant frames for the motion of the subject. This positional data may then be used for rendering images of the object, as will be described below.

Figure 9A:
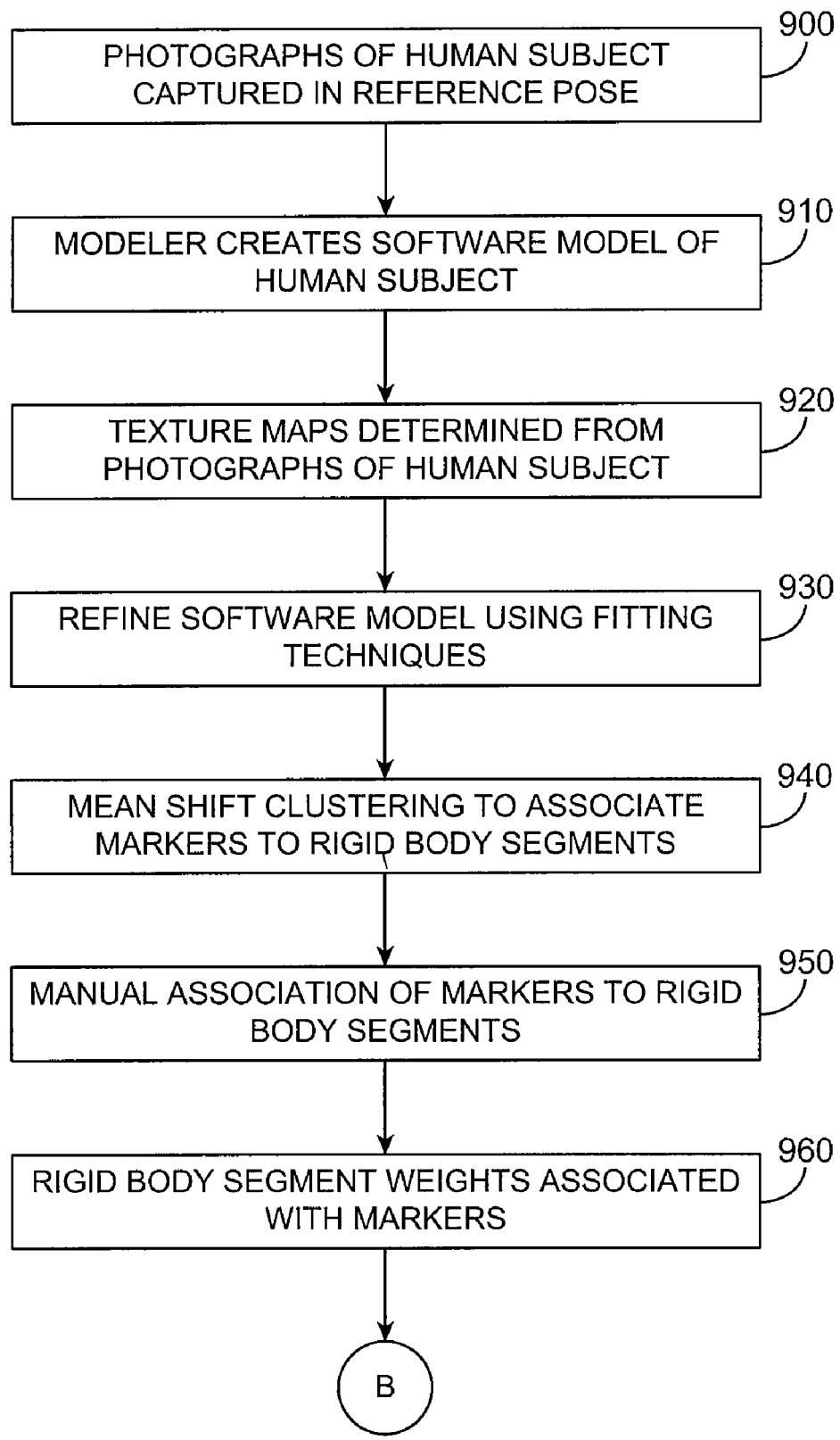
FIGS. 9A-B illustrate a block diagram of a process according to various embodiments of the present invention.
Figure 9B:
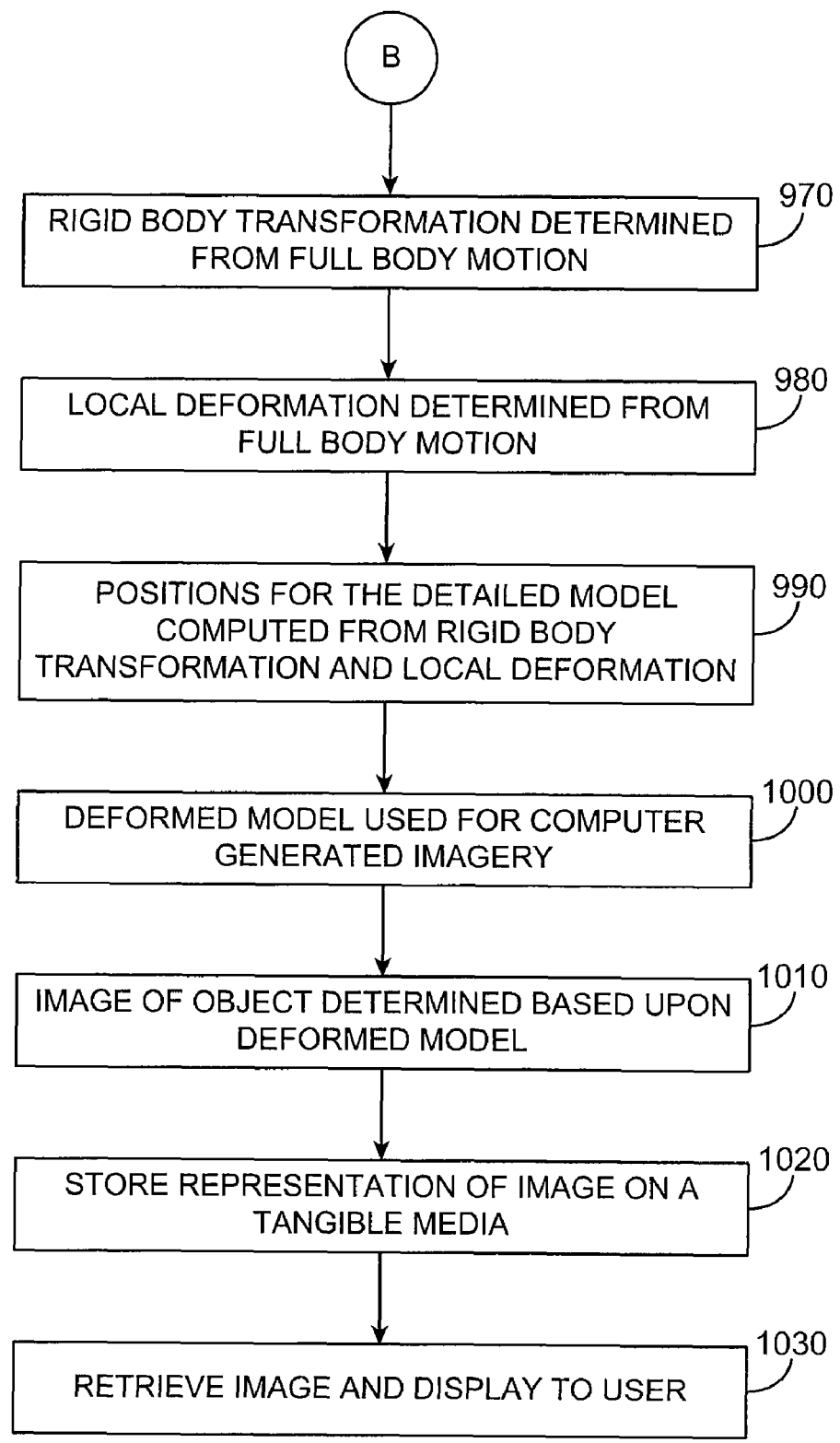

FIGS. 9A-B illustrate a block diagram of a process according to various embodiments of the present invention. More specifically, FIGS. 9A-B illustrate a process for using motion captured data for purposes of rendering an object.

In various embodiments of the present invention, given positions of markers for each desired frame, calculating skin animation is typically a scattered data interpolation problem. More specifically, vertices in a detailed model of the subject are deformed to match the desired marker locations in the frame. Because spatial deformations for human subjects is highly complex, standard linear interpolation techniques such as radial basis functions are not used in various embodiments.

In some embodiments, the deformation of the detailed model includes two pieces, as will be described below. Briefly, the detailed model is segmented into a set of rigid parts, and then the local deformation that remains is considered. In various embodiments, any residual deformation includes higher-order deformations, such as twisting and bulging are then represented as a linear combination of a set of defined primitive deformation modes. Lastly, in some embodiments, remaining residuals are resolved using radial basis interpolation.

Initially, one or more photographs of the subject are taken, for example in the reference pose, step 900. Based upon the photographs, a user, e.g. a modeler, creates a three-dimensional software model of the subject, step 910. Conventional tools such as Maya, may be used to create such models. In various embodiments, various measurements of the subject, the marker distances, and the like, are provided to the modeler. The photographs may also be used as a basis for texture maps for the model, step 920.

In various embodiments, the inventors have determined that created models often do not properly align with the shape of the subject or the marker position. Accordingly, optimization fitting techniques may be used to further define the detailed model, step 930. In some implementations, a technique is used that registers two surfaces and determines a global transformation for each vertex that minimizes or reduces a objective function.

In one example, the objective function minimizes the sum of the distance from each marker to a surface. In other examples, the objective function attempts to preserve the original shape of the detailed model by reducing or minimizing the sum of the difference between the global transformation of pairs of neighboring vertices in the detailed model. In other examples, the objective function attempts to maintain a correspondence between the markers and the vertices at determined landmarks of the subject. In one embodiment, forty different landmarks of a human subject are referenced, including elbows, knees, and the like. In various embodiments, weights are applied to the second and third terms, so that the detailed model is initially globally registered. Subsequently, after convergence, the optimization may be repeated with equal weights for terms.

In FIG. 9A, the positions of markers are segmented to remove the rigid body motion. In various embodiments, near-rigid segmentation techniques may be used. As merely an example, mean shift clustering may be applied to the marker positions, to group triangles having similar rotational movement, step 940.

Figures 10A, 10B, 10C:
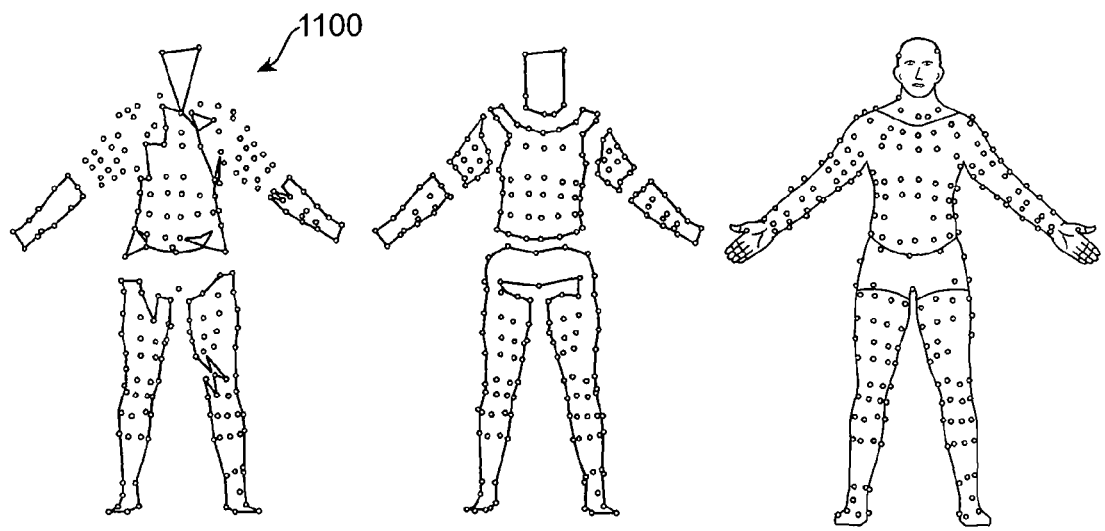
FIGS. 10A-C illustrate examples of various embodiments of the present invention.

FIGS. 10A-C illustrate examples of various embodiments of the present invention. More specifically, FIG. 10A illustrates a result of a mean shift clustering process. As illustrated, regions of large deformation 1100, such as around the upper arms and shoulders are not clustered with a specific rigid portion (shown unshaded). In the present example, the mean shift calculation determines a large number of triangles that do not belong to any clustered group. Accordingly, as illustrated in FIG. 10B, user intervention was required to further specify which markers belong to which the rigid body segments, step 950. In the example illustrated in FIG. 10B, seventeen rigid parts were defined by a user. In other embodiments, a different number of segments may be defined. Further, for different subjects, e.g. humans, plants, animals, inanimate objects, different segmentations are also contemplated.

In various embodiments, a set of weight values are assigned to the markers using the following criteria, step 960:

$$\alpha_{i,p}, 1 \leq p \leq N_p$$

In this relationship, $\alpha_{i,p}$ is a weight value of the marker $m_i$ for part p. Additionally, $N_p$ represents a total number of parts. Further:

$$\sum_{p=1}^{N_p} \alpha_{i,p} = 1$$

In various embodiments, a weight is defined as "1" if a marker is inside the segment, and otherwise the weight is "0." For markers on boundaries between parts, the weight values are computed based upon the likelihood that the marker belongs to each of the neighboring part. In one specific instance, the marker's motion is compared to the rigid body motion of the neighboring parts (as defined by the markers that are defined as inside the part). In various embodiments, based upon an error value, a Gaussian model is use to compute the likelihood, as further described in the above-mentioned provisional application. In one experiment, a marker was defined as being assigned to a part if the weight was larger than a defined threshold, e.g. 0.2. In some cases, markers may belong to more than one part.

In some embodiments of the present invention, the weight of each vertex of the detailed model may be determined by locating the nearest triangle of the marker surface. Based upon the weights of the three markers in the triangle, the weight of the marker may be interpolated based upon the weight of the marker. In various embodiments, the weight value for part p of the vertex j is $\beta_{j,p}$. FIG. 10C illustrates an example of a weight distribution of the detailed model following the process described above. As illustrated, some markers are associated with more than one rigid part (i.e. there are no unshaded portions).

Based upon the segmentation, in various embodiments, as will be discussed below, the full body motion of the subject is then segmented into a rigid body transformation, step 970, and a local deformation, step 980. Further, the local deformation is divided into two terms: a quadratic deformation and a residual. As will be illustrated below, the local deformations are performed to smooth the transition from different segments of the object.

Returning to FIG. 9A, for each rigid part in the reference pose, described above, a local frame is defined. This local frame is termed a "local part reference frame." In various embodiments, the origin of the local frame is the average of the reference pose position of all markers assigned to this part. Further the three axes of the local part reference frame are defined as three eigenvectors of a covariance matrix of the marker's positions.

Next, in various embodiments, a rigid translation and rotation of the part p are determined, step 980. In such embodiments, the global position of part p is transformed into its local position as: $\tilde{d}_p^0 \in \mathbb{R}^{3\times 1}$ and $\tilde{R}_p^0 \in \mathbb{R}^{3\times 3}$. The position of the i-th member marker assigned to part p is defined as: $p_{p,i}$, $1 \leq i \leq Y_p$, where $Y_p$ is the number of markers in part p. Accordingly, for a position $p_{p,i}^0$ at the reference position, the corresponding local position $\hat{p}_{p,i}^0$, termed the local part reference position of the marker, is determined as follows:

$$\hat{p}_{p,i}^0 = \tilde{R}_p^0(p_{p,i}^0 + \tilde{d}_p^0)$$

As illustrated in FIG. 11, a rigid transformation for markers within part p is computed. More specifically, a rigid transformation ($\tilde{d}_p^t$ and $\tilde{R}_p^t$) is determined such that the position of the member markers are brought towards their local part reference positions. In various embodiments, the markers are brought as close as possible to their respective local part reference positions using techniques described in the above-mentioned provisional application. As a result of this process, the local position $\hat{p}_{p,i}^t$ is determined as follows:

$$\hat{p}_{p,i}^t = \tilde{R}_p^t(p_{p,i}^t + \tilde{d}_p^t)$$

In various embodiments, a remaining error or difference between $\hat{p}_{p,i}^t$ and the reference position for that marker corresponds to the local deformation contribution to the marker position. The local deformation is approximated with a continuous deformation field.

Because subjects, e.g. human subjects, movements include many non-linear type deformations, such as twisting, bulging, and bending, in various embodiments, a quadratic deformation is used to represent the local deformations. Using this approach, complex non-linear deformations are modeled as a linear combination of 3×9 basic deformation modes. In various embodiments, the quadratic transformation is defined as a matrix:

$$\tilde{A} = [A_1 A_2 A_3] \in \mathbb{R}^{3\times 9}$$

where $A_1 \in \mathbb{R}^{3\times 3}$ corresponds to a linear transformation, and $A_2 \in \mathbb{R}^{3\times 3}$ and $A_3 \in \mathbb{R}^{3\times 3}$ are pure quadratic and mixed quadratic transformations.

Then, given a three dimensional position: $p=[p_x, p_y, p_z]^T$, the quadratic transformation provides a new transformed position $\tilde{p}$, $\tilde{p}=\tilde{A}q$, where $q=[p_x, p_y, p_z, \tilde{p}_x^2, \tilde{p}_y^2, \tilde{p}_z^2, p_xp_y, p_yp_z, p_xp_z]^T$ is a nine dimensional quadratic vector corresponding to p. In various embodiments, for each frame, the components of the quadratic transformation $\tilde{A}_p^t$ of part p are then computed. In some embodiments, the transformation should bring the local part reference position of all member markers towards (e.g. as close as possible) to their local positions at frame t. A pseudo inverse is used to solve for this transformation:

$$\tilde{A}_p^t = \hat{P}^t (Q^0)^T [Q^0 (Q^0)^T]^{-1}, \text{ such that:}$$

$$\hat{P}^t = [\hat{p}_{p,i}^t, \ldots, \hat{p}_{p,Y_p}^t] \in \mathbb{R}^{3 \times Y_p},$$

$$Q^0 = [q_{p,i}^0, \ldots, q_{p,Y_p}^0] \in \mathbb{R}^{9 \times Y_p},$$

$q_{p,i}^0$ is a quadratic vector corresponding to the local part reference position $p_{p,i}^0$.

In various embodiments, given the transformed position $\tilde{p}_{p,i}^t = \tilde{A}_p^t q_{p,i}^0$, a radial basis interpolation is used to resolve the remaining residual $r_{p,i}^t = p_{p,i}^t - \tilde{p}_{p,i}^t$. Specifically, this may be done by determining a weight vector $w_{p,i}^t$ such that:

$$r_{p,j}^t = \sum_{i=1}^{Y_p} w_{p,i}^t \phi\left(\frac{\|\tilde{p}_{p,i}^t - \tilde{p}_{p,j}^t\|}{\sigma_p}\right), \text{ for } 1 \leq j \leq Y_p$$

In this representation, $\phi(.)$ is a radial basis function and $\sigma_p$ is a dilation factor for part p. In various experiments, a cubic B-spline is used as the radial basis function, and the dilation factor is set to be twice the maximum distance between two nearest member markers for each part.

In various embodiments, given $\tilde{d}_p^t$, $\tilde{R}_p^t$, $\tilde{A}_p^t$ and $w_{p,i}^t = \{w_{p,1}^t, \ldots, w_{p,Y_p}^t\}$ at frame time t, any given position $\hat{p}_p^0$ represented in the local part reference frame of part p can be transformed back to its global position $p^t$ as follows:

$$p^t = (\tilde{R}_p^t)^{-1} \cdot \left(\tilde{A}_p^t \hat{q}_p^0 + \sum_i w_{p,i}^t \phi\left(\frac{\|\tilde{A}_p^t \hat{q}_p^0 - \tilde{p}_{p,i}^t\|}{\sigma_p}\right)\right) - \tilde{d}_p^t$$

In this representation, $\hat{q}_p^0$ is the quadratic vector of $\hat{p}_p^0$. Accordingly, for a given position $v_j^0$ of vertex j of the detailed model in the reference pose, its deformed position is computed as:

$$v_j^t = \sum_{p=1}^{N_p} \beta_{j,p} v_{j,p}^t$$

In this relationship, $v_{j,p}^t$ is the deformed positions related to part p.

Subsequently, the positions for the detailed model may then be computed for the specific frame using the above deformations, step 990.

In various embodiments, the deformed model for each frame may be used for any conventional shading or rendering purposes, step 1000. It should be understood that because positions of many, if not all markers for the deformed model are known, the deformed model may be referenced from virtually any camera position, and with virtually any light source. As examples of rendering, the surface of the deformed model may be used as a base surface for clothes, hair, fur, etc.; the deformed model may be used for computing shadows in a scene; the deformed model may be used to affect positions of objects in a scene, e.g. hitting a box; and the deformed model may be viewed in a "Matrix-type" rotated camera effect; or the like. In light of the present disclosure, any other conventional uses of motion captured data can be used with embodiments of the present invention.

In one specific example, texture mapping operations are performed to texture map the textures of the detailed model (e.g. the skin) in the reference pose to the detailed model in the specific frame, as will be illustrated, below.

In various embodiments, a result of the rendering operations may be a image of an object controlled with the deformed model described above, step 1010. The object may be placed within a live action scene, an animated scene, or the like. The image or a representation of the may be stored in a tangible medium such as a hard disk, an optical disk, film media, or the like, step 1020. Subsequently, the image or the representation of the image may be retrieved from the tangible medium, and displayed to a user, step 1030. For example, the image may be displayed on a computer monitor, on a home entertainment system, a theater, a forum, or the like.

The inventors of the present invention have performed a number of experiments and verified the effectiveness of various embodiments of the present invention. For example, Table 1, below illustrates the effectiveness of the clean-up type operations discussed above as applied to a human subject wearing 350 markers. Table 1 also illustrates the number of frames involved for a number of example subject motions. Next, based upon the motion capture system, a number of trajectories (labeled and unlabeled) are identified. As can be seen, more dynamic motions tend to cause a greater number of disconnected trajectories.

Using embodiments of the merging operations described above, the number of trajectories is dramatically reduced. Additionally, the number of incorrectly labeled trajectories, the number of wrong or missing trajectories, and the number of manually merged trajectories is small.

Table 1 shows a number of partial trajectories assigned wrong labels and the number of manual corrections required to merge missing unlabeled trajectories. Based upon this experimental data, it has been determined that these wrong and missing trajectories occur mainly around the elbows during large deformations. In various embodiments, the number of trajectories after merging is often higher than the number of markers. Reasons for this include noise and motion capture artifacts.

TABLE 1

| example motions (# of frames) | # of trajectories before merging | # of trajectories after merging | incorrectly labeled (error rate) | manual merging | total # of holes |
|---|---|---|---|---|---|
| flexing (917) | 859 | 379 | 0 (0.0%) | 4 | 25674 |
| golfing (868) | 2368 | 439 | 10 (0.4%) | 32 | 36232 |
| punching (574) | 2247 | 409 | 25 (1.1%) | 44 | 22948 |
| jumprope (974) | 5006 | 538 | 32 (0.6%) | 64 | 42050 |

In various experiments, the accuracy of the hole filling process, described above compared to actual marker positions is illustrated in Table 2, for a punching motion. In these experiments, the average error was normalized and was determined to be approximately 2%. This is well within the acceptable range of error for computer generated imaging applications, or the like.

TABLE 2

| region | abdomen | elbow | thigh | knee |
| --- | --- | --- | --- | --- |
| Avg. Error | 0.017 | 0.022 | 0.020 | 0.023 |
| Max. Error | 0.052 | 0.062 | 0.045 | 0.051 |

FIGS. 11A-D illustrate examples of various embodiments of the present invention. More specifically, FIGS. 11A-D illustrate an implementation of the hole filling process, described above.

Figures 11A, 11B:
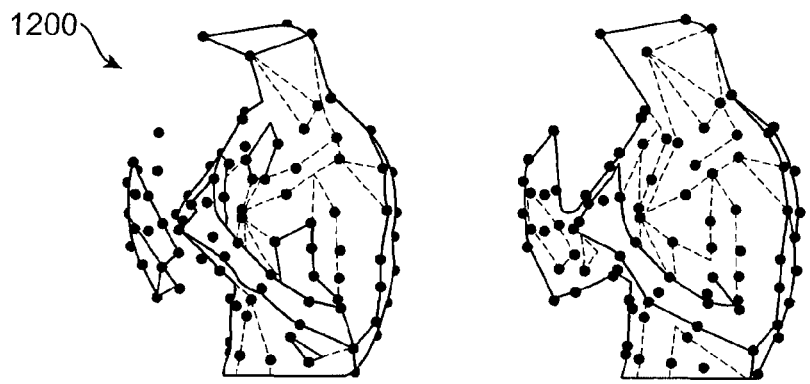
FIGS. 11A-D illustrate examples of various embodiments of the present invention.
Figures 11C, 11D:
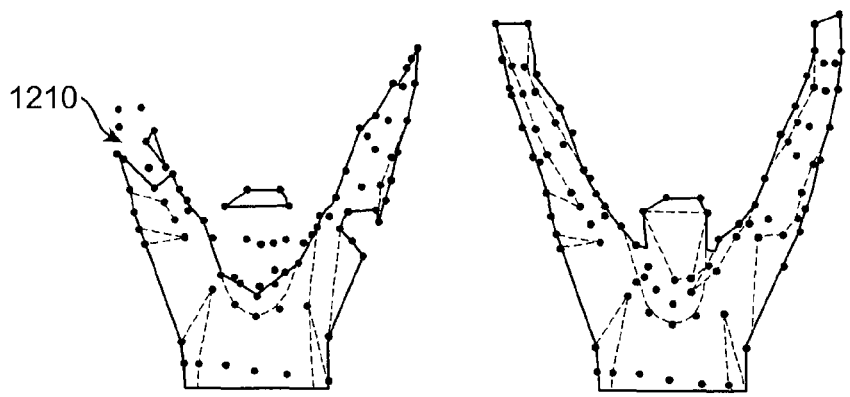

In FIGS. 11A and C, illustrate marker surfaces with regions 1200 and 1210 where positional data for markers are missing. Using embodiments of the present invention, the positions of the missing markers are determined, as illustrated in FIGS. 11B and D.

Figure 12A:
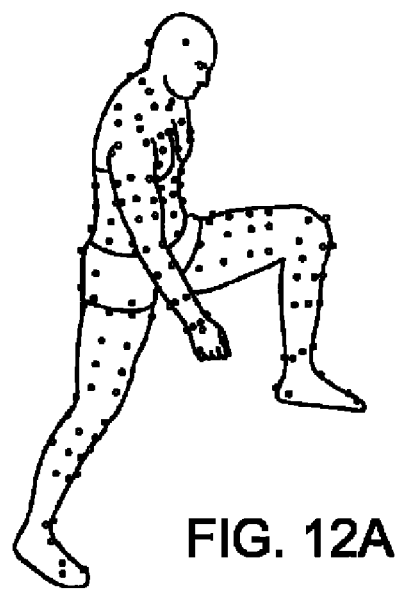
FIGS. 12A-E illustrate examples of various embodiments of the present invention compared to various techniques.
Figure 12B:
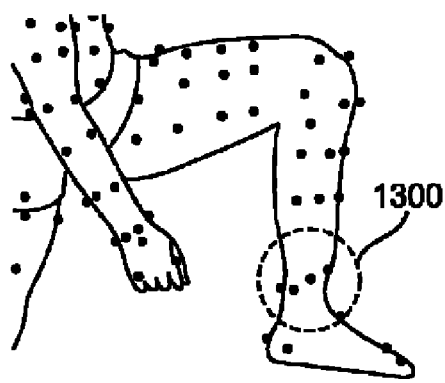
Figure 12C:
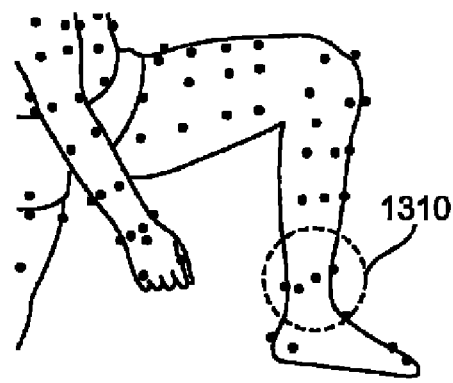

FIGS. 12A-E illustrate examples of various embodiments of the present invention compared to various techniques. More specifically, FIG. 12A illustrates an example pose of a subject with markers. In the case where only rigid deformation of a detailed model is performed, visual discontinuities (e.g. 1300) are readily apparent, as illustrated in FIG. 12B. In the case where quadratic deformation of a detailed model is performed, without resolving residuals, visual artifacts (e.g. 1310) are also noticeable. In the case where rigid deformation of the detailed model is performed and residuals are resolved, certain discontinuities (e.g. 1320) are still apparent.

Figure 12D:
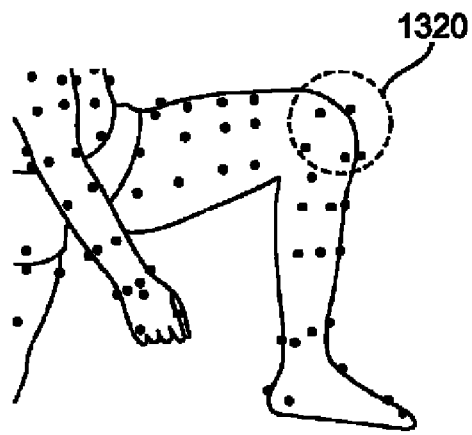
Figure 12E:
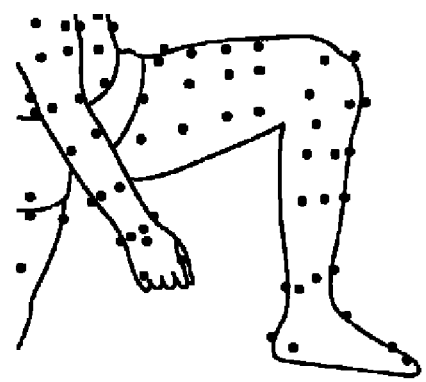

Illustrated in FIG. 12D is an example according to an embodiment of the present invention. As described above, the detailed model is deformed using a quadratic deformation and the residuals are resolved. In practice, the quadratic deformation generally provides a smoother deformation that follows the markers more accurately, due to higher order deformation terms. In various embodiments, after resolving the residuals, the results are greatly improved.

Figure 13A:
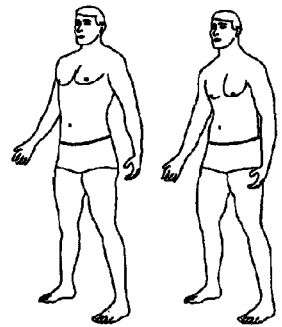
FIGS. 13A-F illustrate examples of various embodiments of the present invention compared to a prior technique.
Figure 13B:
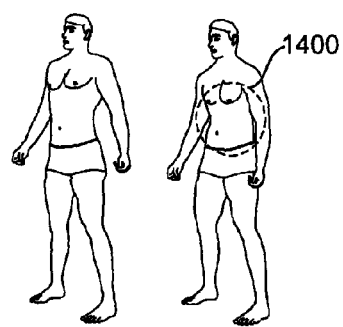

FIGS. 13A-B and D-F illustrate examples of various embodiments of the present invention compared to various techniques. More specifically, FIG. 13A illustrates frames of a human subject performing the action of deep breathing. Using embodiments of the present invention, a computer-generated character is generated, as illustrated in FIG. 13B. As can be seen in FIG. 13B, the CG character appear to be breathing, as illustrated in the change in shape of the diaphragm 1400.

Figure 13C:
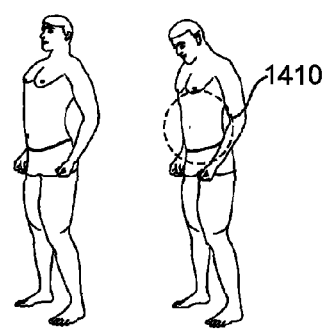

In contrast, FIG. 13C illustrates a computer-generated character generated using conventional motion capture systems. As can be seen, although the CG character appears to be breathing, as indicated by the position of the shoulders, the diaphragm 1410 does not change shape.

Comparing the images of FIG. 13A to FIG. 13C illustrate how embodiments of the present invention can now be used to more accurately capture and animate dynamic action of portions of the subject while in action.

Figure 13D:
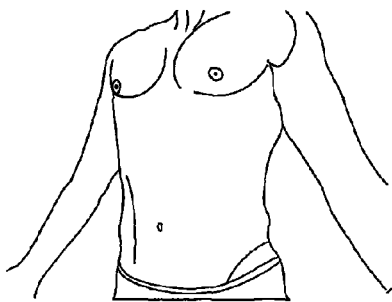
Figure 13E:
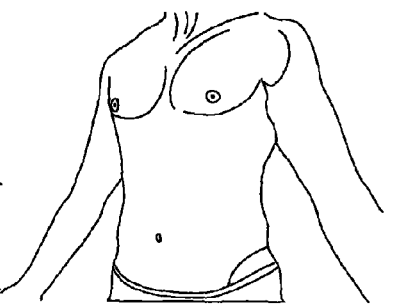
Figure 13F:
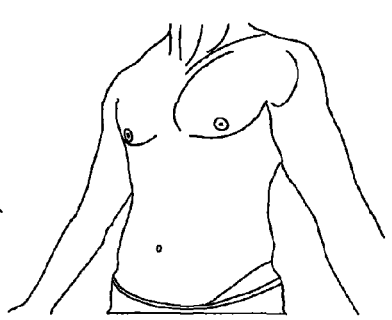

FIGS. 13D-F are more detailed examples of a computer generated character breathing. As can be seen, the shape of the pectoral and stomach muscles appear to change in response to the underlying rib cage expanding and contracting.

In the above application, it was demonstrated that data captured from a large set of markers can be used to animate dynamic motion of a subject, from bending, bulging, jiggling, and the like. Various embodiments provide methods for estimating locations of markers that are missing from a motion capture session, due to self-occlusion, or the like. Unlike facial animation, missing markers are a significant problem when capturing motion of a full body.

Other embodiments also describe method for deforming models of a subject to match the trajectories of captured markers. As discussed above, this includes capturing rigid body motions, and then capturing residual deformations. In contrast to prior techniques, embodiments of the present invention gives users the ability to capture more dynamic motions of subjects and animate CG subjects to include more subtle surface motions (e.g. bouncing).

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a memory and a processor comprising:

receiving global positional data associated with a set of markers from a plurality of markers associated with a surface of an object at a first time instance in the memory, wherein global positional data associated with a first marker from the plurality of markers is absent at the first time instance, and wherein distances between adjacent markers from the set of markers and the first marker associated with the surface of the object dynamically vary with object movement;

using local statistical methods to determine global positional data associated with the first marker at the first time instance with the processor in response to the global positional data associated with the set of markers at the first time instance; and determining a model of the object including non-linear deformations to the surface of the object with the processor in response to the global positional data associated with the set of markers at the first time instance, the global positional data associated with the first marker at the first time instance, and the dynamically varying distances;

wherein the non-linear deformations are generated in response to the dynamically varying distances.

2. The method of claim 1 further comprising positioning the plurality of markers on the surface of the object; and wherein receiving global positional data comprises:

illuminating at least the set of markers on the surface of the object; and optically capturing reflections from at least the set of markers.

3. The method of claim 1 wherein using local statistical methods to determine global positional data associated with the first marker at the first time instance comprises:

determining local positions of the first marker with respect to the set of markers at a second time instance with the processor;

determining local positional data associated with the first marker at the first time instance with the processor in

21 response to the local positions of the first marker with respect to the set of markers at the second time instance; and determining the global positional data associated with the first marker at the first time instance with the processor in response to the local positional data associated with the first marker at the first time instance.

4. The method of claim 1
wherein the first marker is associated with a plurality of neighborhood markers, and
wherein the set of markers is a subset of the plurality of neighborhood markers.

5. The method of claim 1 further comprising
determining that two separate marker trajectories are associated with the first marker with the processor in response to the global positional data associated with the first marker at the first time instance.

6. The method of claim 1 wherein the surface of the object is a skin on a human, or an animal or a plant, and wherein the non-linear deformations to the surface of the object correspond to bulging, or twisting or stretching of the surface of the object.

7. A method for a computer system including a memory and processor comprising:

receiving global positional data associated with a set of markers from a plurality of markers associated with a surface of an object at a plurality of time instances excluding a first time instance in the memory, wherein global positional data associated with a first marker from the plurality of markers is absent at the first time instance, and wherein distances between adjacent markers from the set of markers and the first marker associated with the surface of the object dynamically vary with object movement;

using local statistical methods to determine global positional data associated with the first marker at the first time instance with the processor in response to the global positional data associated with the set of markers for the plurality of time instances; and determining a model of the object including non-linear deformations to the surface of the object with the processor in response to the global positional data associated with the set of markers and the global positional data associated with the first marker at the first time instance, and the dynamically varying distances;

wherein the non-linear deformations are generated in response to the dynamically varying distances.

8. The method of claim 7 wherein using local statistical methods to determine global positional data associated with the first marker at the first time instance comprises:

determining local positions of the first marker with respect to the set of markers for the plurality of time instances with the processor;

determining local positional data associated with the first marker at the first time instance with the processor in response to the local positions of the first marker with respect to the set of markers for the plurality of time instances; and determining the global positional data associated with the first marker at the first time instance with the processor in response to the local positional data associated with the first marker at the first time instance.

22

9. The method of claim 7
wherein the first marker is associated with a plurality of neighborhood markers, and
wherein the set of markers is a subset of the plurality of neighborhood markers.

10. The method of claim 7 wherein the surface of the object is a skin on a human, or an animal or a plant, and wherein the non-linear deformations to the surface of the object correspond to bulging, or twisting or stretching of the surface of the object.

11. A computer program product comprises code resident on a non-transitory tangible media and executable on a computer system comprising a processor, the computer program product comprising:

code that instructs the processor to receive global positional data associated with a set of markers from a plurality of markers associated with a surface of an object at one or more time instances, wherein global positional data associated with a first marker from the plurality of markers is absent from a first time instance, and wherein distances between adjacent markers from the set of markers and the first marker associated with the surface of the object dynamically vary with object movement;

code that instructs the processor to use local statistical methods to determine global positional data associated with the first marker at the first time instance in response to the global positional data associated with the set of markers at the one or more time instances; and code that instructs the processor to determine a model of the object including non-linear deformations to the surface of the object in response to the global positional data associated with the set of markers and the global positional data associated with the first marker at the first time instance, and the dynamically varying distances;

wherein the non-linear deformations are generated in response to the dynamically varying distances.

12. A computer system comprising:

a memory configured to store global positional data associated with a set of markers from a plurality of markers associated with a surface of an object at one or more time instances, wherein global positional data associated with a first marker from the plurality of markers is absent from a first time instance, and wherein distances between adjacent markers from the set of markers and the first marker associated with the surface of the object dynamically vary with object movement; and a processor coupled to the memory, wherein the processor is configured to use local statistical methods to determine global positional data associated with the first marker at the first time instance in response to the global positional data associated with the set of markers at the one or more time instances, and wherein the processor is configured to determine a model of the object including non-linear deformations to the surface of the object in response to the global positional data associated with the set of markers and the global positional data associated with the first marker at the first time instance, and the dynamically varying distances;

wherein the non-linear deformations are generated in response to the dynamically varying distances.

* * * * *